United States Patent

[11] 3,563,583

[72] Inventors Joe P. Gentry
 East Lansing, Mich.;
 George R. Giannini, Davis, Calif.
[21] Appl. No. 817,000
[22] Filed Apr. 17, 1969
[45] Patented Feb. 16, 1971
[73] Assignee The Regents of the University of California
 Berkeley, Calif.

[54] MACHINE FOR TIEING KNOTS
 10 Claims, 4 Drawing Figs.
[52] U.S. Cl. .................................................... 289/2
[51] Int. Cl. ............................................... A01d 59/04
[50] Field of Search ........................................ 219/2, 18

[56] References Cited
 UNITED STATES PATENTS
2,860,902 11/1958 Diels ............................ 289/2
2,913,270 11/1959 Sachsenroder et al ........ 289/2
2,913,271 11/1959 Sachsenroder et al ........ 289/2

Primary Examiner—Louis K. Rimrodt
Attorney—Lothrop & West

ABSTRACT: A machine for tying knots on a wire withdraws twine from a source and blows a length of the twine to lie between two grippers located to hold the twine length near the ends thereof. The length is cut from the source and is engaged by a hook on the projected end of a flexible rod reciprocated within a convolute comprised of a longitudinally slit tube shaped like a clove hitch and encompassing the wire at a station thereon. The flexible rod withdraws through the convolute, the hook holding one end of the twine length, pulling that twine end from the adjacent gripper and pulling the twine length through the convolute and around the wire. The other gripper holds the twine length for final tensioning and tightens the knot so formed. The machine advances along the wire to the next station leaving the knot on the wire.

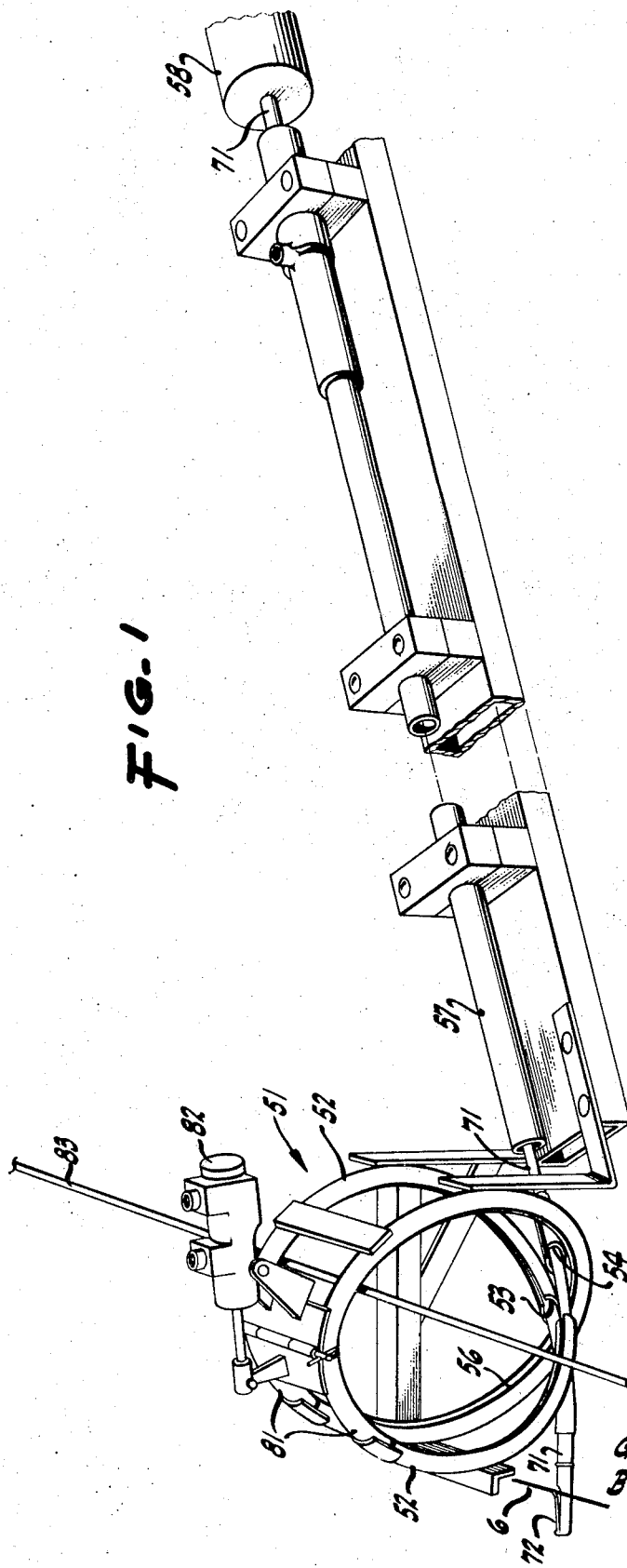

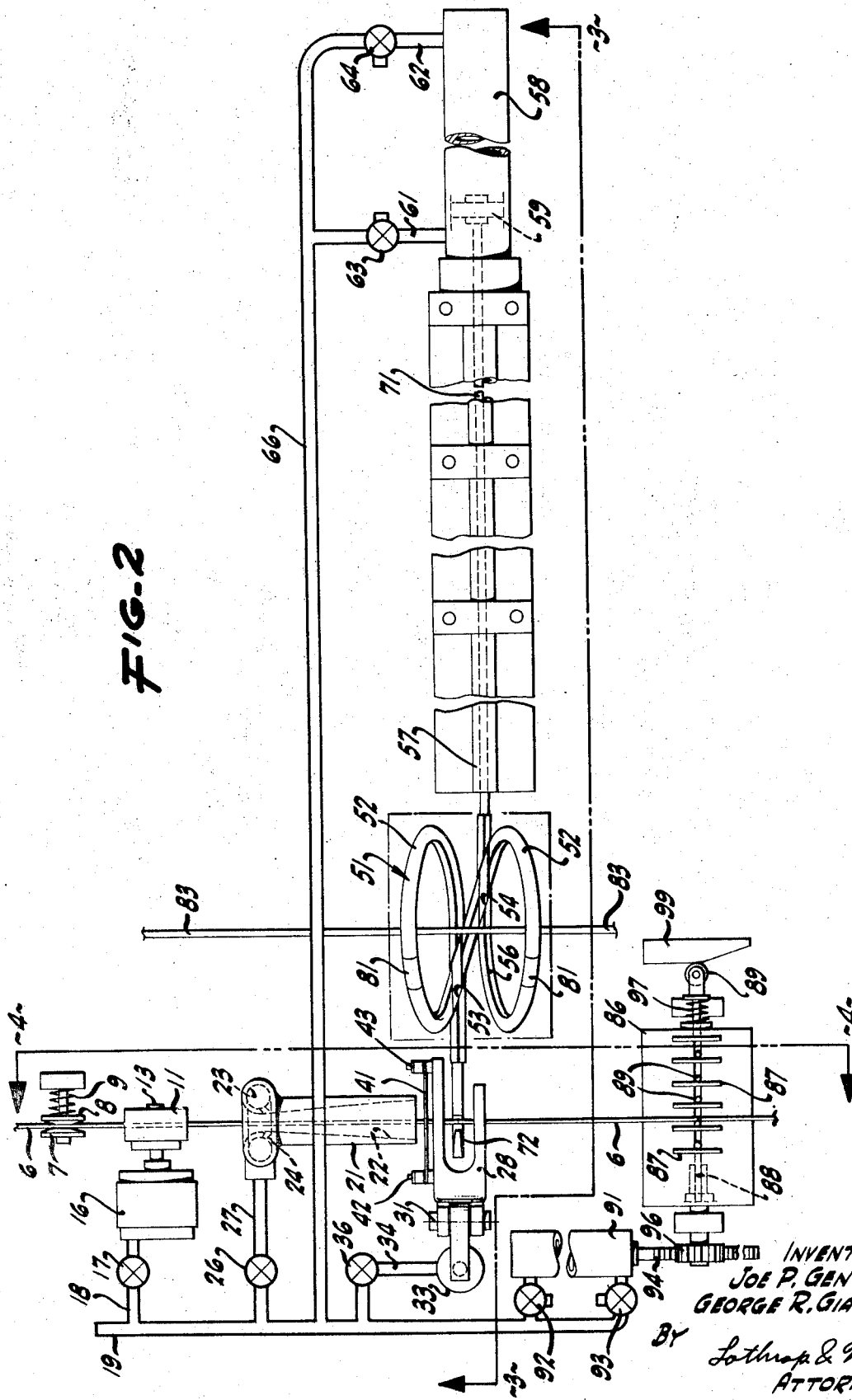

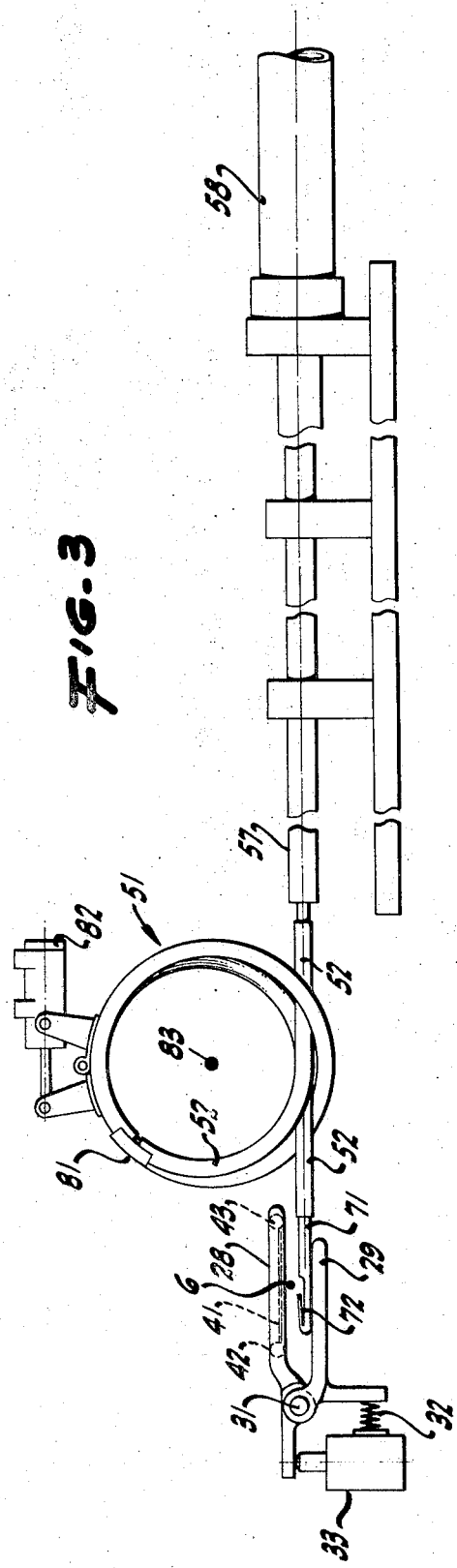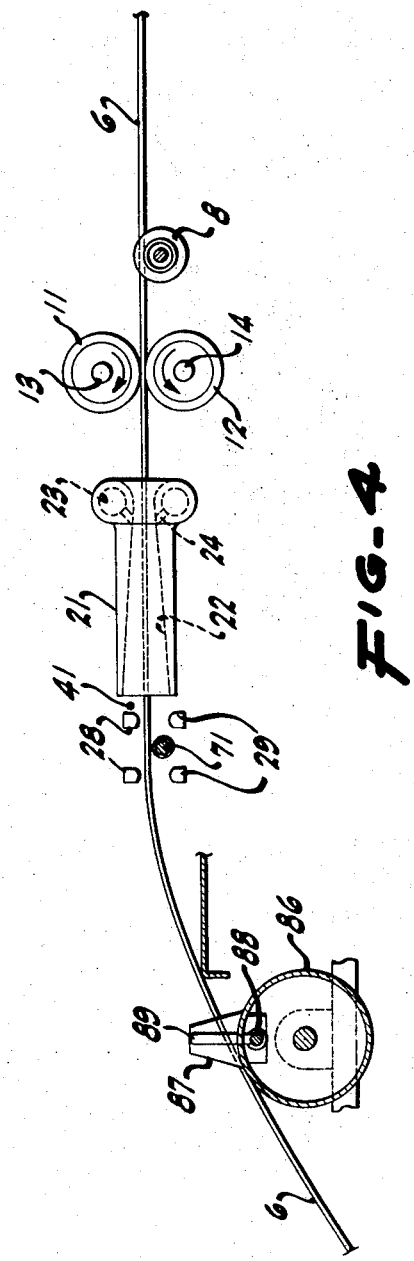

MACHINE FOR TIEING KNOTS

In the cultivation of certain field crops, for example the raising of hop vines, the customary culture is to plant the vines in rows and to provide above the row at a height approximately 20 feet from the ground a generally horizontal metallic wire supported on suitable posts or the like. When the hop vines begin to grow then manual labor is employed on ladders to advance along the wire and at appropriate intervals to tie twine, sometimes coir twine, to the wire. The twine is then brought down to the ground near the crowns of the hop plants so that the growing hop vines can engage with and climb up the several lengths of twine to the wire. At the end of the season the materials are removed from the wire and it is necessary to retie new twines for the next season. The foregoing procedure involves a great deal of difficult manual labor and is slow in that it requires laborers to move from the ground to a substantial height many times during the day. The difficulties attendant upon this type of culture are numerous.

It is therefore an object of the invention to provide a machine for tying knots that can be utilized in connection with the present style of culture to tie twine knots on the wire and to leave the twine in position for fastening near the crown on the ground, all of the tying function being done automatically.

Another object of the invention is to provide a knot tying machine which can effectively utilize different kinds of twine and is capable of providing a series of appropriate and tight knots in selected spaced locations on the horizontal wire.

Another object of the invention is to provide a knot-tieing machine which is capable of operating relatively rapidly and without failure so that a good deal of climbing structure for the hop vine can be provided in a short time.

Another object of the invention is to provide a knot-tying machine which can readily be operated substantially automatically and without the intervention of manual labor except perhaps for general supervision and occasional maintenance.

Another object of the invention is to provide a knot-tying machine which is generally an improvement over machines for tying knots heretofore available.

Other objects of the invention together with the foregoing are set forth in the embodiment of the invention described in the accompanying description and illustrated in the accompanying drawings in which:

FIG. 1 is a somewhat diagrammatic view partially in perspective and with portions broken away showing the knot-forming portion of the machine;

FIG. 2 is a plan of the structure shown in FIG. 1 and its related structures arranged diagrammatically in the order in which they appear in an actual device;

FIG. 3 is a cross section, the planes of which are indicated by the lines 3—3 of FIG. 2, the showing again being largely diagrammatic and with portions broken away; and FIG. 4 is a cross section of the plane of which is indicated by the line 4—4 of FIG. 2, the showing being largely diagrammatic.

In its preferred form, which has met with successful operation, the entire structure disclosed herein is preferably mounted on some sort of carriage or tractor able to advance in a hop field along a line of the hop plants and the poles for supporting the overhead horizontal wire. None of that structure is shown since it is conventional.

Disposed on the carriage is an arrangement substantially as shown in FIGS. 2 and 4 by which a twine 6 from an appropriate source, not shown, is withdrawn. The twine can be the standard coir twine used for years in this connection, but preferably is one of the modern plastic twines now available, preferably a polypropylene twine. This is supplied so that it can be withdrawn from the supply in a horizontal direction and is initially pulled between friction discs 7 and 8 of the usual sort mounted on an appropriate framework. The framework is omitted herein to reduce the complexity of the figures. The friction discs 7 and 8 are urged toward each other by a helical spring 9 so that there is some drag on the advancing twine in order to maintain the twine in a generally rectilinear orientation.

To draw twine into the machine against the frictional drag there is provided a pair of counterrotating rollers 11 and 12 operating on parallel shafts 13 and 14. The rollers preferably have a somewhat yielding surface to afford a good engagement with the twine. At least one of the rollers is driven by a motor 16, such as a pneumatic motor, since air is a convenient driving fluid. The rollers are driven in the direction of the arrows in FIG. 4 and uniformly draw in the twine whenever the motor 16 is energized. Control of motor operation is by means of a valve 17 located in an air line 18 branching from an air manifold 19 extending to a source of air under pressure, not shown. In the cycle of the machine the air motor 16 is operated at set intervals by a control device, not shown.

Although the rollers withdraw the twine from its source of supply and advance the twine, it is difficult to put a compressive force on the twine and expect it to stay in its desired location. For that reason just downstream of the rollers 11 and 12 there is provided a venturi casing 21. This is a body having a venturi shaped interior passage 22 of adequate size to permit the twine to travel therethrough without any frictional restriction. The venturi casing includes an annular air chamber 23 having a number of nozzles 24 extending from the chamber into the venturi throat. Air from the manifold 19 under the automatically timed control of a valve 26 is led through a duct 27 into the chamber 23. When the valve 26 is open air discharges from the jets 24 downstream through the venturi. The action of this air blast is to induce the inflow of the twine and to blow the twine out from the venturi in substantially a straight line for a considerable distance.

The twine emerging from the venturi passes between a first gripper including an upper fork 28 and a lower fork 29. These forks are designed to pivot about a common axis 31 on the framework. The lower fork preferably is arranged to serve as a sort of anvil of a yielding nature and, hence, is engaged by a coil spring 32 (FIG. 3) resting against the side of a pneumatic cylinder 33 connected by a pipe 34 to a timed valve 36. The upper fork is impelled downwardly by a plunger in the cylinder whenever the valve 36 admits air to the cylinder 33 from the manifold 19. Thus the forks are oscillated together and apart at appropriate times during the operation of the machine.

One of the fork members, preferably a part of the fork 28, carries an incandescent wire 41 mounted between insulators 42 and 43 on the fork 28. The wire is supplied by suitable means, not shown, with electrical current so that the wire operates at an elevated temperature. When the forks are brought toward each other the wire is moved into contact with the twine and severs the twine by burning or melting leaving one portion gripped between the forks while severing that portion from the twine upstream.

Particularly in accordance with our invention there is arranged alongside the mechanism just described a knotting convolution generally designated 51. This is primarily a tube 52 of generally circular cross section convoluted in substantially the form shown. The tube is not entirely continuous, however, since there are gaps 53 and 54 therein. In addition the tube 52 is not entirely continuous in a cross-sectional circumferential sense since the tube has a continuing slot 56 therein. The outboard end of the tube extends close to and terminates approximately between the forks.

The other end of the tube extends to a guide 57 of tubular form serving as a housing and extending to a cylinder 58. This cylinder contains a piston 59 impelled by air introduced into the cylinder 58 through pipes 61 and 62. These are under the control of valves 63 and 64 supplied with air through a conduit 66 joined to the manifold 19 and operated at appropriate times. The piston 59 has as a piston rod a flexible rod 71 moving to and fro with the motion of the piston. The rod 71 passes through the guide 57 and then extends into and passes through the configuration of the knotting convolution 51 emerging from the end thereof to lie well between the branches of the forks and also to lie underneath the path of the twine 6. The outboard end of the rod 71 carries a hook 72. The hook is a flexible member converging with the main body of the rod 71.

In the operation of this portion of the machine with the parts substantially as they are seen in the FIGS. the twine 6 is advanced over the friction discs 7 and 8 by the rollers 11 and 12 and by the air into the venturi 22 until the twine lies between and beyond the forks in a position just above the rod 71 in the vicinity of the hook 72. To make sure that the twine is in proper position to be subsequently engaged by the hook the upper fork is lowered thus depressing the local portion of the twine into contact with the rod 71 below the hook elevation. At this time the hot wire 41 severs the trailing part of the twine still in the venturi. Usually the advanced twine engaged by the forks is from, say, 20 to 25 feet long.

Upon depression of the forks the upper fork grasps the twine and holds it tightly against the lower fork which can yield slightly to limit the pressure and to accommodate any possible overtravel. Thereupon the piston 59 is withdrawn into the cylinder 58 and the rod 71 is retracted. The retracting movement causes the hook 72 to engage with the end of the twine and frictionally to withdraw the twine from between the jaws of the forks. The hook with the twine end then travels in the convoluted path, as shown in FIG. 2, with the twine extending out through the slot 56 and with the twine travelling through a similar convolution.

Prior to the operation of the machine the convolution 51 is initially interrupted by the opening of a gate 81 by hand operation of a pneumatic cylinder 82. The open convolution is brought to encompass the wire 83 whereupon the gate 81 is closed to reestablish the continuity of the convolute. The subsequent advance and withdrawal of the rod 71 then brings the twine in a similar path and forms a knot in the form of a clove hitch around the wire 83. When the hook 72 has gone through the complete convolution the piston 59 is stopped.

This operation forms a relatively loose clove hitch on the wire 83. In order to tighten the knot so formed we provide on the framework a second gripper including a drum 86 carrying a plurality of radial vanes 87 extending partly around the drum periphery. The advanced twine which has passed between the forks rests by gravity on the drum between any pair of the vanes at random. Also mounted on the drum is an axially extending rod 88 carrying radial fingers 89 in one position disposed alongside the vanes 87.

The drum 86 is mounted for rotation by means of a piston and cylinder mechanism 91 fed with pneumatic fluid under the control of valves 92 and 93 joined to the manifold 19. The mechanism 91 actuates a rack 94 engaged with a pinion 96 on the drum shaft. At an appropriate time the drum is revolved forwardly throughout most of a revolution. When the cylinder 91 is reversed the rack is retracted. During the forward or counterclockwise rotation of the drum, as seen in FIG. 4, the pins 89 are moved away from rest position by a spring 97 which urges a roller 98 on the rod 88 to follow a stationary cam 99. Thus, no matter where on the drum it lies, the twine is gripped between one of the rods 89 and the adjacent vane. When the drum turns the end of the twine is pulled, thus tightening the knot.

As the whole machine advances along the wire 83 the knotted end of the twine is pulled out from the hook 72 sideways.

The timing of the various air valves is such that the parts operate in sequence as described and the parts of the machine are restored for another cycle or operation.

In general we have provided a machine for tying knots which is effective to take twine from a source, measure out an appropriate length and cut off the desired length after the twine has been engaged with a knotting mechanism. The knotting mechanism goes through a cycle to tie a knot on a suspension wire. The knotted twine is tightened on the wire and is released from the knotting mechanism as the machine advances.

We claim:

1. A machine for tying knots on a wire comprising a convolute tube arranged to have an open center portion and to encompass a wire, a flexible rod movable to and fro within said tube, and at one end to project from said tube, first and second twine gripping devices spaced a predetermined distance apart, means for extending a length of twine in position to be gripped by said devices, means on said end of said rod for engaging said length of twine, means for pulling said rod and said engaging means with said length of twine engaged therewith away from said first gripping device and through said convolute tube, and means for actuating said second gripping device to tension said twine between said second gripping device and said engaging means.

2. A device as in claim 1 in which said convolute tube includes a portion movable to pass said wire from the exterior of said convolute tube to said center portion thereof.

3. A device as in claim 1 in which said convolute tube has an open longitudinal slot to pass twine.

4. A device as in claim 1 in which said twine-extending means includes a venturi and means for discharging air downstream through said venturi alongside twine passing through said venturi.

5. A device as in claim 1 in which said twine-extending means includes driven rollers for gripping and advancing twine in the vicinity of said engaging means.

6. A device as in claim 1 in which said first twine gripping device includes means for severing said twine.

7. A device as in claim 1 in which said second twine-gripping device includes means for alternately gripping and releasing said twine.

8. A device as in claim 4 in which said twine-extending means advances a predetermined length of twine from a source through said venturi.

9. A device as in claim 1 including means for moving said flexible rod and said twine-extending means in timed relationship.

10. A device as in claim 7 in which said second twine-gripping device includes means for engaging said twine and pulling said twine in a direction to tighten a knot in said twine.